US007724990B2

(12) United States Patent
Ishida

(10) Patent No.: US 7,724,990 B2
(45) Date of Patent: May 25, 2010

(54) FIBER ARRAY UNIT WITH INTEGRATED OPTICAL POWER MONITOR

(75) Inventor: Kenzo Ishida, Albany, CA (US)

(73) Assignee: AiDi Corporation, Tibaraki (JP)

( * ) Notice: Subject to any disclaimer, the term of this patent is extended or adjusted under 35 U.S.C. 154(b) by 0 days.

(21) Appl. No.: 12/171,488

(22) Filed: Jul. 11, 2008

(65) Prior Publication Data
US 2009/0016716 A1 Jan. 15, 2009

Related U.S. Application Data

(60) Provisional application No. 60/949,259, filed on Jul. 12, 2007.

(51) Int. Cl.
*G02B 6/12* (2006.01)
*G02B 6/26* (2006.01)
*G02B 6/30* (2006.01)

(52) U.S. Cl. .............................. 385/14; 385/47; 385/49; 385/65; 385/83

(58) Field of Classification Search .................... 385/14, 385/47, 49, 50, 65, 83, 132
See application file for complete search history.

(56) References Cited

U.S. PATENT DOCUMENTS

| | | | |
|---|---|---|---|
| 5,499,309 A * | 3/1996 | Kozuka et al. ................. 385/38 |
| 5,999,670 A * | 12/1999 | Yoshimura et al. ............ 385/49 |
| 6,222,967 B1 * | 4/2001 | Amano et al. .................. 385/49 |
| 6,406,196 B1 * | 6/2002 | Uno et al. ...................... 385/89 |
| 7,324,718 B2 * | 1/2008 | Iwasaki et al. ................. 385/14 |
| 2007/0019899 A1 * | 1/2007 | Ohtsu et al. .................... 385/14 |

FOREIGN PATENT DOCUMENTS

| | | |
|---|---|---|
| EP | 1 133 082 A1 | 9/2001 |
| JP | 2005-010373 A | 1/2005 |

OTHER PUBLICATIONS

Notification of Transmittal of the International Search Report and the Written Opinion of the International Searching Authority, or the Declaration, PCT Application No. PCT/US2008/0699741, dated Apr. 27, 2009 (29 pgs.).

* cited by examiner

*Primary Examiner*—Charlie Peng
(74) *Attorney, Agent, or Firm*—Jeffrey R. Klembczyk, Esq.; Kevin P. Radigan, Esq.; Heslin Rothenberg Farley & Mesiti P.C.

(57) ABSTRACT

A technique for monitoring optical power in a fiber array unit having a plurality of optical transmission waveguides terminating at an edge thereof for carrying optical signals to and/or from a PLC. A tapping filter is placed within a slit formed in the substrate and interrupting the transmission channels, thereby tapping at least some of the optical power from the channels and directing the tapped optical power toward respective photodetector channels for detection, while allowing other optical power to continue transmission in the at least one channel of the fiber array unit.

8 Claims, 3 Drawing Sheets

_US 7,724,990 B2_

FIBER ARRAY UNIT WITH INTEGRATED OPTICAL POWER MONITOR

CROSS-REFERENCE TO RELATED APPLICATION

This application claims the benefit of U.S. Provisional Application No. 60/949,259, filed Jul. 12, 2007, which is hereby incorporated herein by reference in its entirety.

TECHNICAL FIELD

The present invention relates to an optical power monitoring function integrated into a fiber array unit (FAU), which can be easily assembled in a standard planar lightwave circuit (PLC) component package without jeopardizing quality and reliability.

BACKGROUND OF THE INVENTION

Conventional optical channel monitoring in planar waveguide circuits (PLCs) used for fiber-optic communication is usually implemented separately outside of the PLC product packaging; resulting in more complex integration of optical channel monitoring within an optical network. If the optical channel monitoring function is integrated into the PLC components, special PLC design is necessary, and the entire PLC component package should be hermetically sealed to protect against any moisture-related reliability concerns typically associated with semiconductor photodetector devices.

For example, if external optical channel monitors are considered, they require separate packaging from the PLC packaging; and optical path connection via optical fiber splicing, or other optical connectorization external to the PLC and fiber array units (FAU) which provide the fiber connection to the PLC along the PLC chip edge(s). The size of entire packaging will be increased, and optical connection paths also increase. Photodetectors as well as low-loss, zero-slope fused coupler components are necessary, requiring at least two fused splicing operations. This results in higher costs, larger size, and tedious assembly.

Power monitor detector chips inside the PLC packaging, attached directly to monitor waveguides along the edge of PLC chips, are also possible. However, this requires specially-designed PLCs, with dedicated monitoring channel waveguides (tapped on-chip from the operational waveguides) to drive the power monitor detectors attached to the chip. The detectors are separate from the fiber array unit(s) (FAUs) which always require attachment to the operational waveguides along the edge of the chip for network functionality. In this case, conventional off-the-shelf PLC chips cannot be utilized, because they usually will not have separate monitor waveguides. Also, the separate optical power monitor detector chips require anti-moisture environmental protection to provide long-term reliability. Special techniques are necessary to attach the detector chips to the edge of the PLC chip, aligned with the monitor waveguides. And, the entire PLC packaging still requires hermetic packaging which increases the packaging costs dramatically.

The present invention addresses these problems, by providing a power monitoring function, integral to the fiber array unit, requiring no special PLC re-designs, and facilitating hermetic sealing.

SUMMARY OF THE INVENTION

The shortcomings of the prior art are addressed, and additional advantages are provided by the present invention which in one aspect is a fiber array unit (FAU) with optical power monitor capability, for use with a planar waveguide circuit (PLC). The FAU includes a substrate; at least one optical signal transmission channel disposed within the substrate, terminating at an edge of the substrate for transmitting signals to and/or from the PLC. A photodetector channel for monitoring the optical signal is provided, along with a tapping filter disposed within the substrate and interrupting the at least one channel, thereby tapping at least some of the optical power from the channel and directing the tapped optical power toward the photodetector channel for detection therein, while allowing other optical power to continue transmission in the at least one channel.

The FAU may include a plurality of optical signal transmission channels arranged in parallel and terminating at the edge of the substrate for transmitting optical optical signals to and/or from the PLC, wherein the tapping filter interrupts each transmission channel and directs tapped optical power toward a respective photodetector channel for detection therein, while allowing other optical power to continue transmission in each transmission channel.

The tapping filter may be a unitary, planar structure at least partially optically transparent, disposed within a slit cut through the substrate and interrupting each transmission channel, at an angle allowing the respective tapped optical power to be directed to each photodetector channel, and other optical power to continue transmission within each transmission channel.

The FAU may be provided in combination with a PLC, the edge of the FAU being attached to an edge of the PLC, wherein the ends of the each optical transmission channel along the edge of the substrate are aligned to respective transmission waveguides of the PLC, terminating at the edge of the PLC.

The optical monitoring function of the fiber array unit can then be the primary, if not the only, monitoring function for the optical power in the optical signal transmission channels.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter regarded as the invention is particularly pointed out and distinctly claimed at the conclusion of the specification. The foregoing and other objects, features, and advantages of the invention are apparent from the following detailed description taken in combination with the accompanying drawings in which:

DETAILED DESCRIPTION OF THE INVENTION

Figure 1:
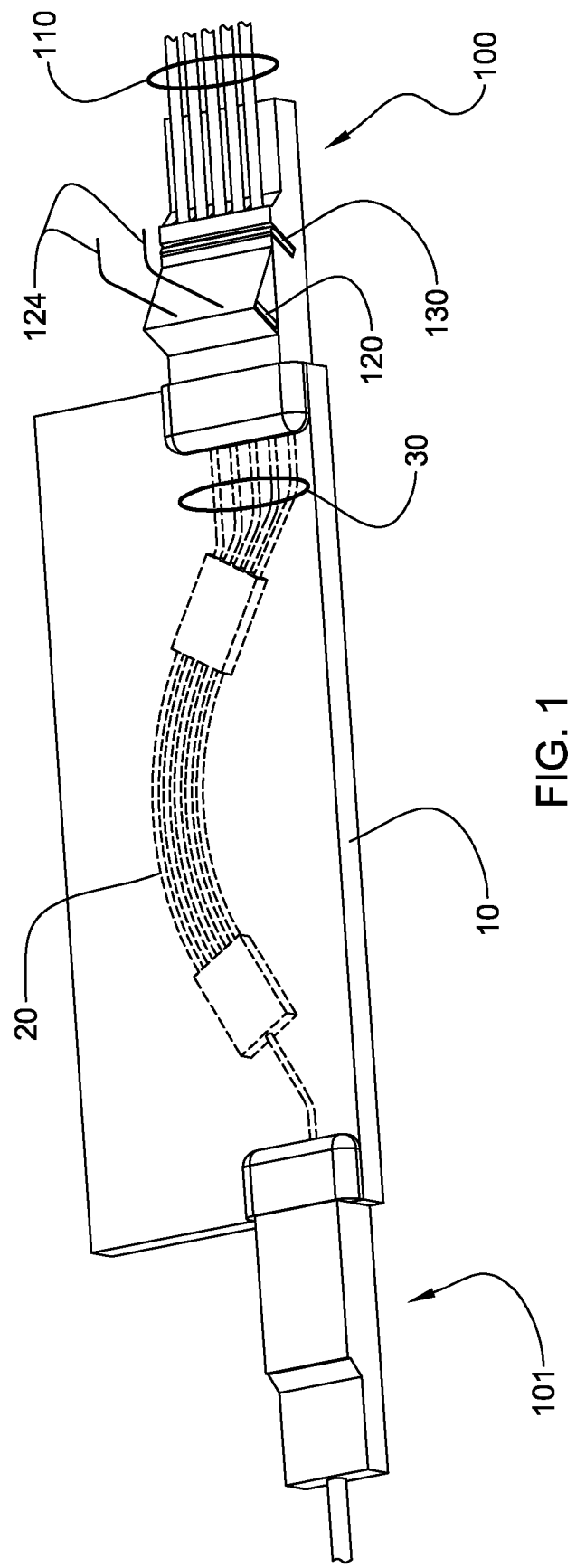
FIG. 1 is a schematic view of a planar waveguide circuit (PLC) coupled to a fiber array unit (FAU) formed in accordance with the principles of the present invention.

With reference to FIG. 1, a typical planar waveguide circuit (PLC) 10 is shown, specially designed to implement an exemplary arrayed waveguide grating (AWG) 20, with input and/or output waveguides 30 running toward the edge of the PLC. (AWGs are known in the art, along with many other optical circuits that could be implemented within PLC 10, and to which the present invention can be directed.)

In accordance with the present invention, fiber array units (FAUs) 100 (and 101) can be attached to the edges of PLC 10, having optical signal transmission channels 110 for carrying optical signals to and/or from the waveguides 30 of PLC 10. Exemplary embodiments of transmission channels include fiber optics, placed in trenches defined within the FAU. As discussed further below, FAU 100 may include a photodetector unit 120 attached thereto, which can be controlled/monitored using anode/cathode pair 130. Photodetector unit 120 monitors at least some of the optical power transmitted within channels 110 using a tapping filter, as discussed below with reference to FIGS. 2 and 3.

Figure 2:
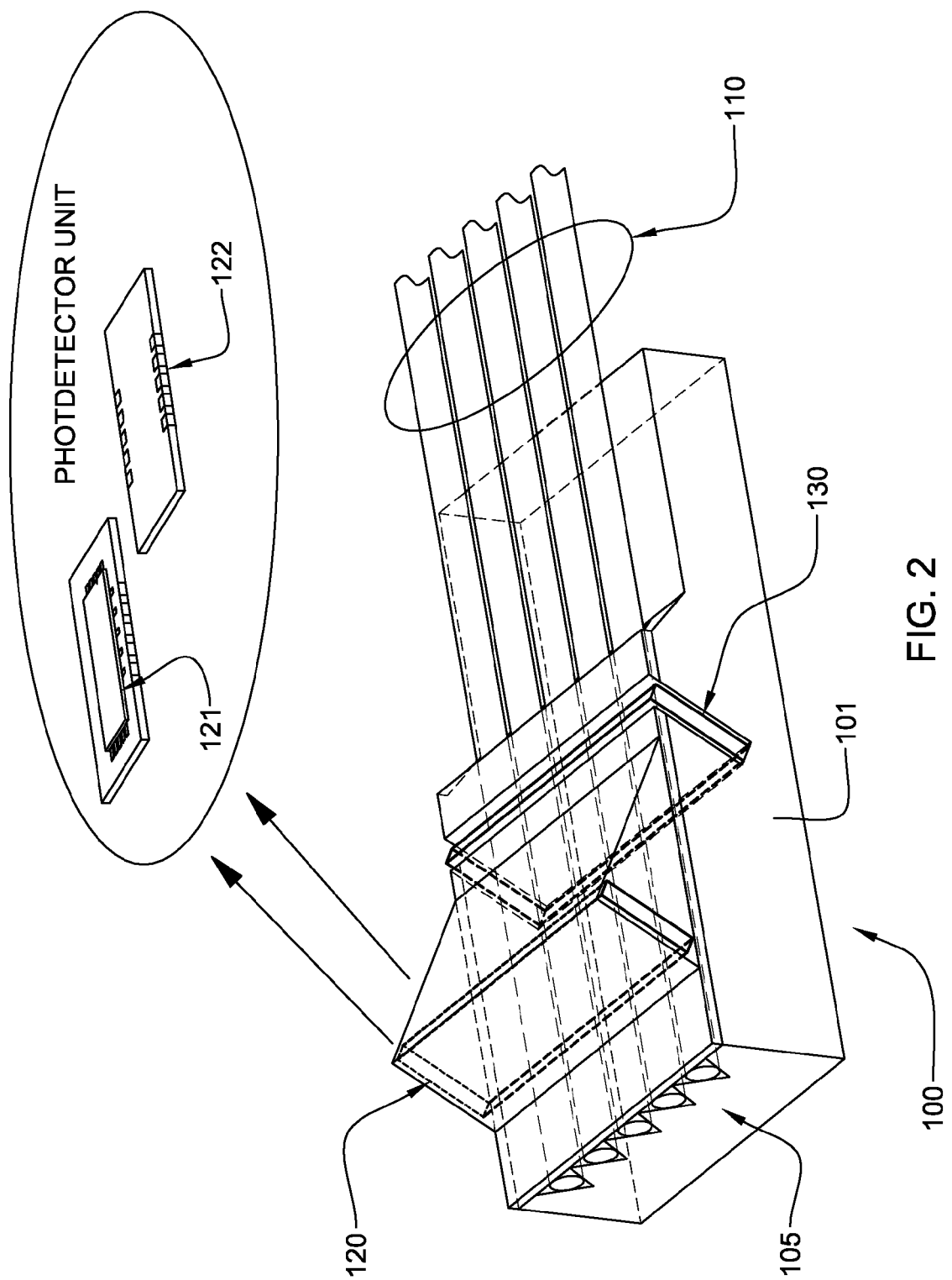
FIG. 2 is a perspective view of the FAU of the present invention, including a photodetector unit.

As shown in FIG. 2 (where like numerals are used to connote like elements), and in accordance with the present invention, a tapping filter 130 is disposed within a substrate 101 of the FAU, which will tap the optical signals from channels 110, directing the tapped optical power as separate light streams, from respective channels 110 toward photodetector unit 120, to thereby provide an optical power monitoring function integral to the FAU 100. Edge 105 of the FAU (at which the transmission channels terminate) forms the planar, light-carrying interface between the FAU and the PLC to which it is eventually aligned and attached. The photodetector channels can be packaged inside a hermetically or semi-hermetically sealed sensor package attached to the FAU; in which case the unit can receive optical signals through a transparent glass or silicone encapsulant. The packaged photodetector unit 120 receives the tapped optical signal streams from respective waveguides 110 in respective photodetector channels 121 via tapping filter 130, and the signals are transformed into respective electrical voltages across electrodes 122, corresponding to the level of tapped optical power in each channel.

The photodetector package will be placed onto the modified FAU shown in FIG. 2 to receive tapped optical signals into the photo detector sensing surface 121. The FAU and photodetector sensor unit are designed for efficient photodetection by fixation in angular alignment to the tapped light stream axes. Photodetector semiconductor chips in either single-channel or multi-channel embodiments can be die-bonded to conventional sensor packages which are hermetic or semi-hermetic. (A true hermetic seal may be a metal seal; but a semi-hermetic seal can also be used such as epoxy sealing.)

Photodetector channels will be electrically connected to anodes and cathodes of photodetector chip pads. Electrical connection can be accomplished with many methods, including backside electrical die bonding, wire bonding from front side, and/or flip chip bonding to the sensor package. The sensor package can have an optically transparent cap (lid) to provide a hermetically or semi-hermetically sealed package.

In accordance with the present invention, the FAU-integrated-OPM (optical power monitor) does not require special monitoring designs for both the PLC, and the assembly process at packaging level (i.e., FAU). This is because the tapping filter 130 integrates directly into the transmission channels of the FAU, rather than to separate PLC monitor waveguides, or to other fiber optic monitoring modules downstream from the FAU. The OPM function is therefore integrated solely into the FAU, thus removing this design constraint from the PLC or downstream fibers. Because an FAU is always required to interface to PLCs, this invention provides the most cost-effective and small-size solution for single-channel as well as multi-channel OPM functions for PLC products, with robust, long-life reliability without requiring expensive hermetic solutions on the entire PLC packaging.

Figure 3:
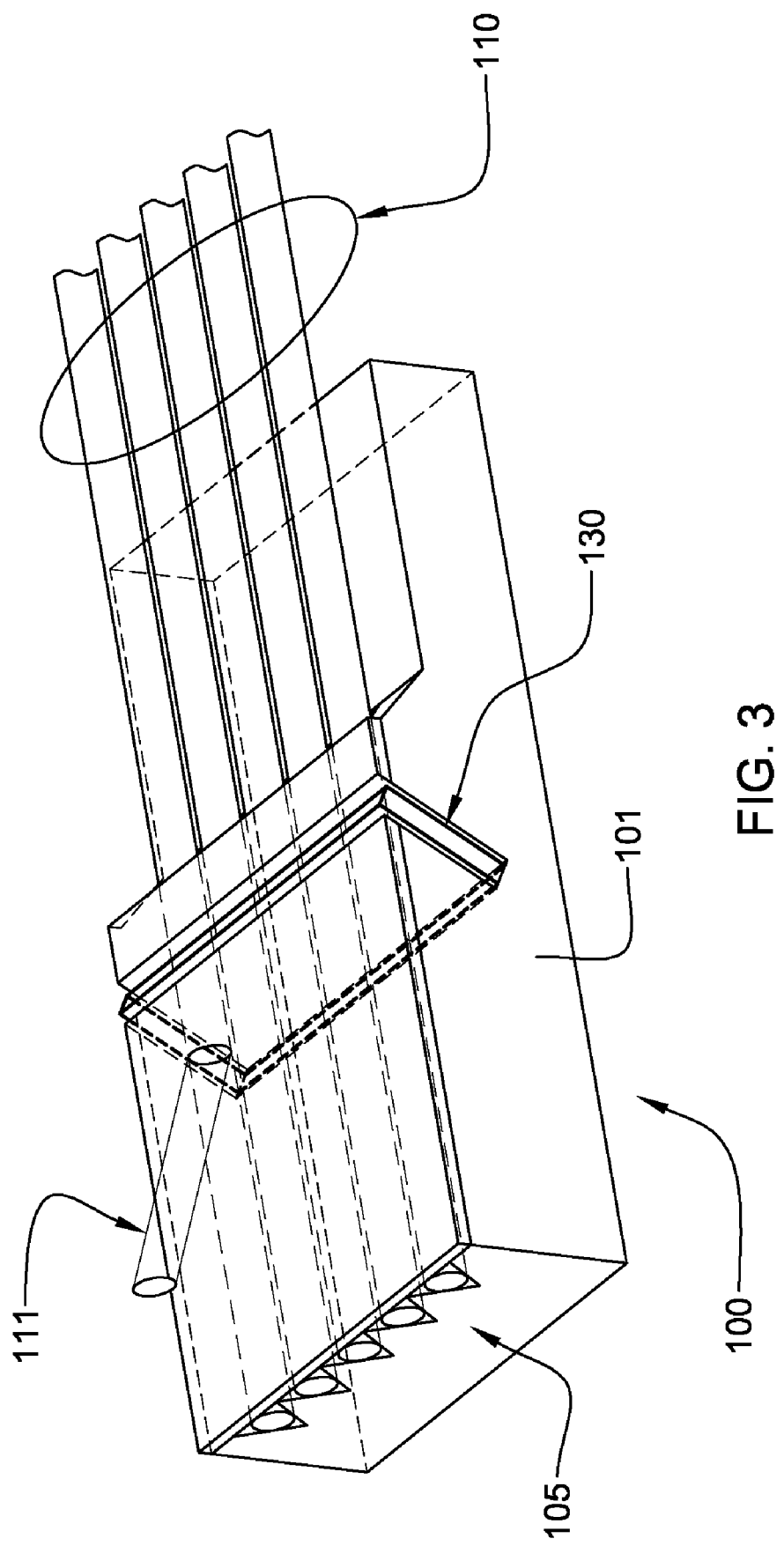
FIG. 3 is a perspective view of the FAU of the present invention depicting additional detail of the placement of the tapping filter.

Additional details of the formation of the FAU of the present invention are evident from FIG. 3 (where like numerals are used to connote like elements), in which a generally planar tapping filter 130 is shown disposed within a slit formed within substrate 101, and which interrupts channels 110. This filter can be fixed with index-matching adhesive using either UV curing and/or thermal curing. The tapping filter can be designed to have a partial light-reflecting function producing a tapper light stream 111 toward the photodetector channel, depending on the tap ratio required, usually 1% through 20%; and partial light transmission for continued transmission of the optical power in channels 110.

The filter can be formed using conventional thin film filter technology. Several coating layers can be spattered over a quartz glass or polymer substrate. Some wavelengths will be reflected and other wavelength will be transmitted. Also, all wavelengths can be reflected at a certain %, such as 1% etc.

The present invention can be used with PLC products which require optical power monitoring. Usually it is used with AWGs for metro ROADM application as well as many optical networks, such as metro-edge, and access networks. The invention can also be applied to splitter products at any optical network node, and/or CATV networks.

If the detector is replaced with another FA unit (e.g., ultra thin film filters—UTF) a WDM thin film filter function can be implemented using two FAUs. Therefore, this invention can be extended to a dual window WDM product, e.g.:

1.31 um range pass, 1.55 um range isolated.
1.55 um range pass, 1.31 um isolated.
1.31 um range pass, 1.55 um and 1.65 um range isolated.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A fiber array unit with optical power monitor capability, for use with a planar waveguide circuit (PLC), comprising:
   a substrate;
   at least one optical signal transmission channel disposed within the substrate, and terminating at an edge of the substrate for transmitting signals to and/or from the PLC;
   a photodetector channel for monitoring the optical signal; and
   a tapping filter disposed within the substrate and interrupting the at least one channel, thereby tapping at least some of the optical power from the channel and directing the tapped optical power toward the photodetector channel for detection therein, while allowing other optical power to continue transmission in the at least one channel;
   wherein the at least one optical signal transmission channel comprises a plurality of optical signal transmission channels arranged in parallel and terminating at the edge of the substrate for transmitting optical signals to and/or from the PLC, wherein the tapping filter interrupts each transmission channel of the plurality of transmission channels and directs tapped optical power toward a respective photodetector channel for detection therein, while allowing other optical to continue transmission in each transmission channel;

wherein each optical transmission channel comprises a fiber optic disposed in the substrate;

wherein the tapping filter comprises a unitary, planar structure at least partially optically transparent, disposed within a slit cut through the substrate and interrupting each transmission channel, at an angle allowing the respective tapped optical power to be directed to each photodetector channel, and other optical power to continue transmission within each transmission channel;

wherein the photodetector channels are arranged in a photodetector unit, mounted onto the substrate and aligned to the tapping filter; and wherein the photodetector unit is hermetically or semi-hermetically sealed.

2. The fiber array unit of claim 1, wherein the fiber array unit is hermetically or semi-hermetically sealed.

3. The fiber array unit of claim 1, in combination with the PLC, the edge of the fiber array unit attached to an edge of the PLC, wherein the ends of each optical transmission channel along the edge of the substrate are aligned to respective transmission waveguides of the PLC, terminating at the edge of the PLC.

4. The combination of claim 3, wherein the optical monitoring function of the fiber array unit comprises the primary or only monitoring function for the optical power in the optical signal transmission channels.

5. A method of forming a fiber array unit having optical power monitor capability, for use with a planar waveguide circuit (PLC), comprising:

providing a substrate;

disposing at least one optical signal transmission channel within the substrate, and terminating at an edge of the substrate for transmitting signals to and/or from the PLC;

providing a photodetector channel for monitoring the optical signal; and disposing a tapping filter within the substrate and interrupting the at least one channel, to thereby tap at least some of the optical power from the channel and direct the tapped optical power toward the photodetector channel for detection therein, while allowing other optical power to continue transmission in the at least one channel;

wherein the at least one optical signal transmission channel comprises a plurality of optical signal transmission channels arranged in parallel and terminating at the edge of the substrate for transmitting optical signals to and/or from the PLC, wherein the tapping filter interrupts each transmission channel of the plurality of transmission channels and directs tapped optical power toward a respective photodetector channel for detection therein, while allowing other optical power to continue transmission in each transmission channel;

wherein each optical transmission channel comprises a fiber optic disposed in the substrate;

wherein the tapping filter comprises a unitary, planar structure at least partially optically transparent, the method further comprising:

forming a slit through the substrate and interrupting each transmission channel, and placing the tapping filter into the slit at an angle allowing the respective tapped optical power to be directed to each photodetector channel, and other optical power to continue transmission within each transmission channel;

wherein the photodetector channels are arranged in a photodetector unit, the method further comprising:

mounting the photodetector unit onto the substrate and aligned to the tapping filter; and wherein the photodetector unit is hermetically or semi-hermetically sealed.

6. The method of claim 5, wherein the fiber array unit is hermetically or semi-hermetically sealed.

7. The method of claim 5, further comprising:

attaching the edge of the fiber array unit to an edge of the PLC, wherein the ends of the each optical transmission channel along the edge of the substrate are aligned to respective transmission waveguides of the PLC, terminating at the edge of the PLC.

8. The method of claim 7, wherein the optical monitoring function of the fiber array unit comprises the primary or only monitoring function for the optical power in the optical signal transmission channels.

* * * * *

UNITED STATES PATENT AND TRADEMARK OFFICE
CERTIFICATE OF CORRECTION

PATENT NO. : 7,724,990 B2  
APPLICATION NO. : 12/171488  
DATED : May 25, 2010  
INVENTOR(S) : Kenzo Ishida It is certified that error appears in the above-identified patent and that said Letters Patent is hereby corrected as shown below:

In the Assignee (73): Delete "Tibaraki, JP" and insert --Ibaraki, JP--

Signed and Sealed this

Third Day of August, 2010

David J. Kappos  
*Director of the United States Patent and Trademark Office*